United States Patent [19]
Bauer et al.

[11] Patent Number: 5,478,106
[45] Date of Patent: Dec. 26, 1995

[54] METHOD AND ARRANGEMENT FOR FORMING AN AIR BAG DEPLOYMENT OPENING

[75] Inventors: David J. Bauer, West Bloomfield, Mich.; John F. Huber, Phoenix, Ariz.; Kenneth J. Barnes, Shelby Township; Michael P. Towler, Ann Arbor, both of Mich.

[73] Assignee: Tip Engineering Group, Inc., Farmington Hills, Mich.

[21] Appl. No.: 279,225

[22] Filed: Jul. 22, 1994

[51] Int. Cl.⁶ .................................................. B60R 21/16
[52] U.S. Cl. ........................................ 280/728.3; 280/732
[58] Field of Search .................... 280/728 B, 730 A, 280/732; 102/275.1, 275.8, 202.7, 325, 326, 307

[56] References Cited

U.S. PATENT DOCUMENTS

| | | |
|---|---|---|
| 4,893,833 | 1/1990 | DiSalvo . |
| 4,989,896 | 2/1991 | DiSalvo et al. . |
| 4,991,870 | 2/1991 | Beusterien . |
| 5,080,393 | 1/1992 | Dixon, Jr. et al. ................. 280/728 B |
| 5,082,310 | 1/1992 | Bauer . |
| 5,154,444 | 10/1992 | Nelson ............................... 280/728 B |
| 5,181,737 | 1/1993 | Lenzen . |
| 5,217,244 | 6/1993 | Bauer ................................ 280/728 B |
| 5,231,928 | 8/1993 | Phillips . |
| 5,288,103 | 2/1994 | Parker et al. ...................... 280/728 B |

Primary Examiner—Eric D. Culbreth
Attorney, Agent, or Firm—John R. Benefiel

[57] ABSTRACT

An arrangement is disclosed for forming an air bag deployment opening in an instrument panel behind which a passenger side air bag is stored, just prior to the time the air bag is deployed, the arrangement including a pressure driven cutting edge cutting through the covering layer at the start of air bag deployment. A pyrotechnic charge ignited by the air bag ignition circuitry is used to develop the pressure, and various devices used to drive the cutting edge, including a flattened tube enclosing the charge and expanded by ignition of the charge. A separate door substrate panel and frame are fit into a preformed opening in the instrument panel, and the tube may be mounted to the door substrate panel, the frame, or a separate membrane.

29 Claims, 11 Drawing Sheets

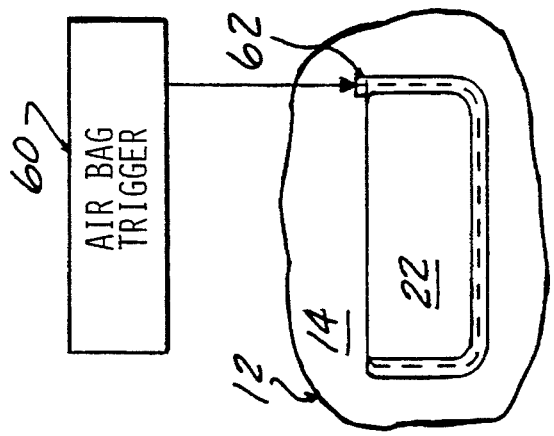
FIG·1A
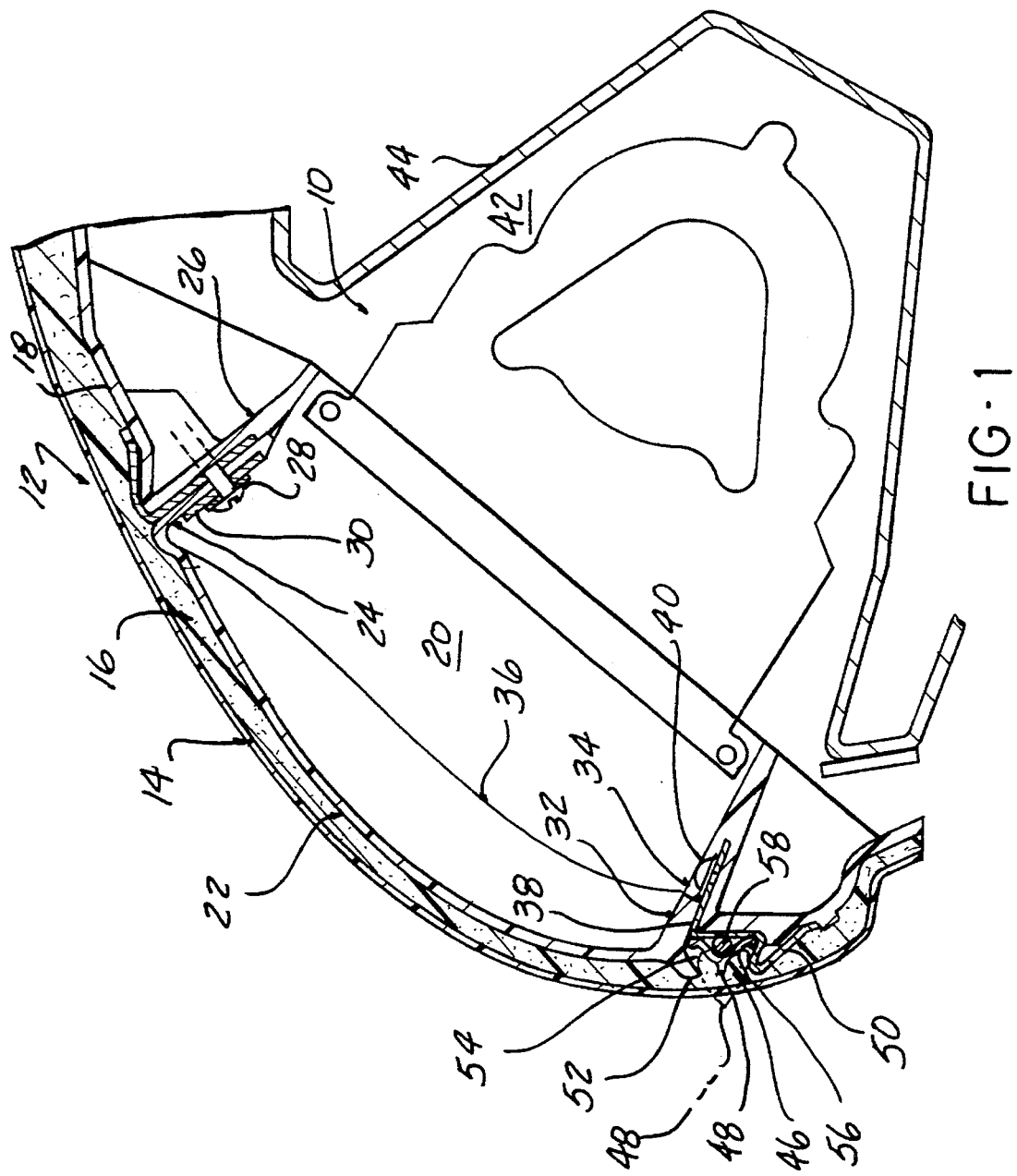
FIG·1

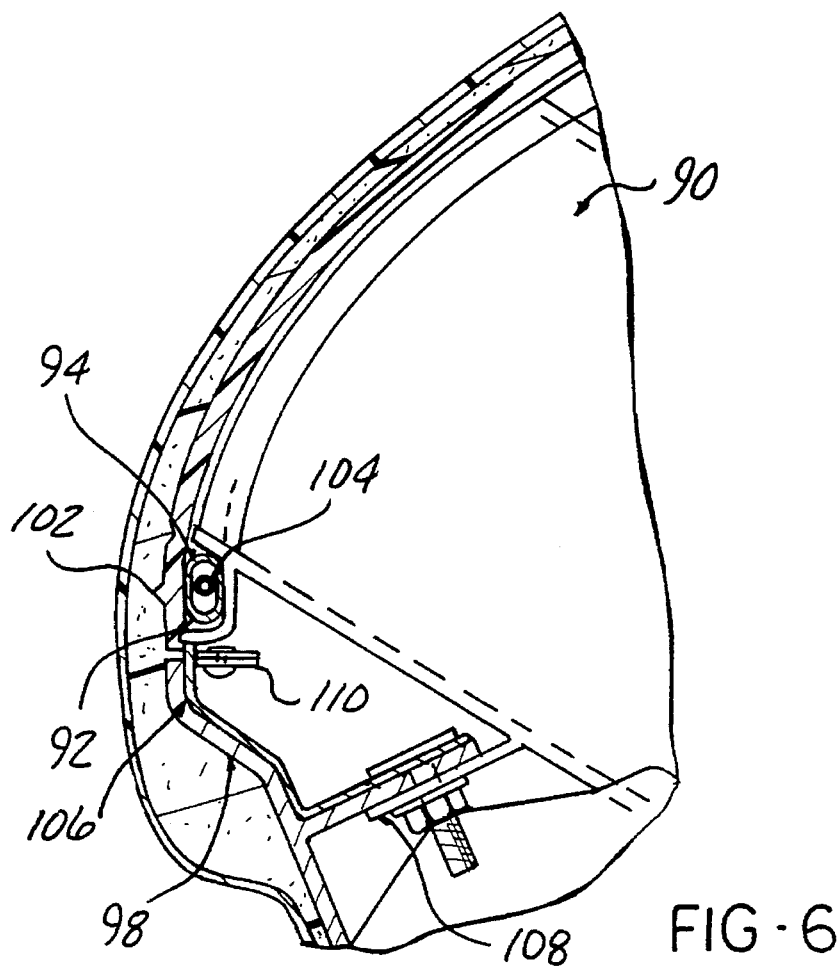
FIG·6
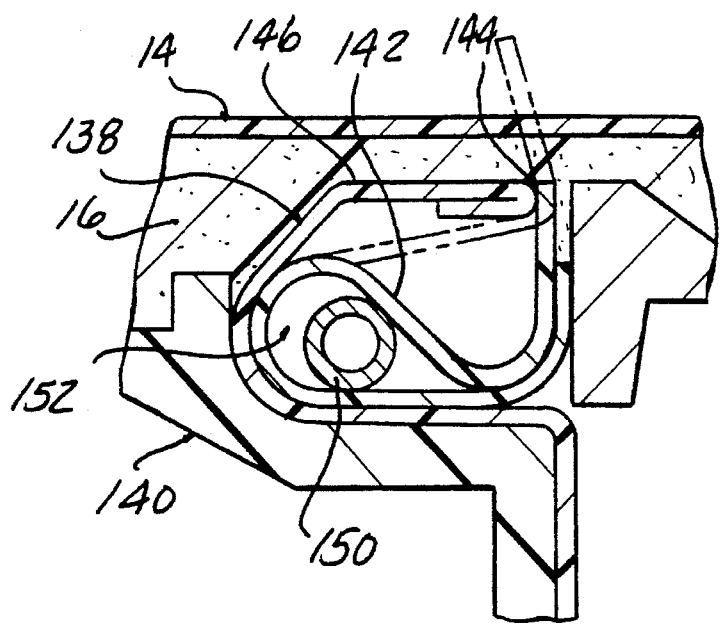
FIG·9

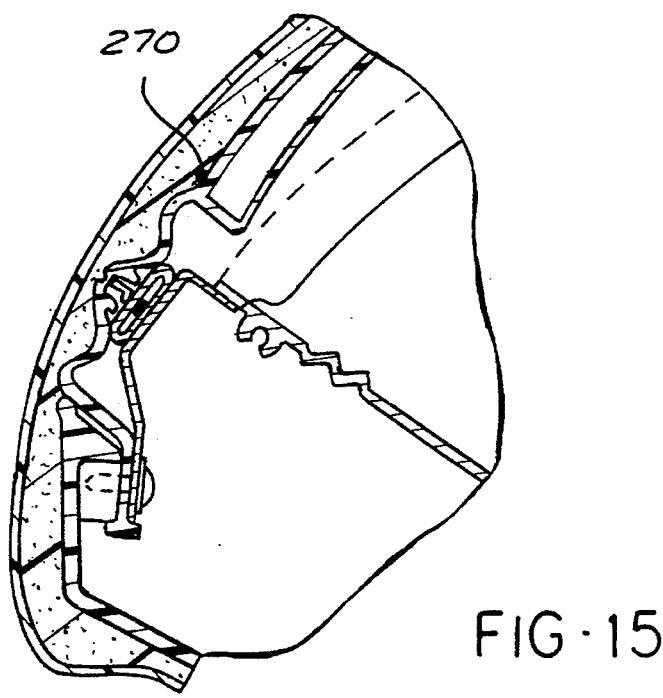
FIG·15
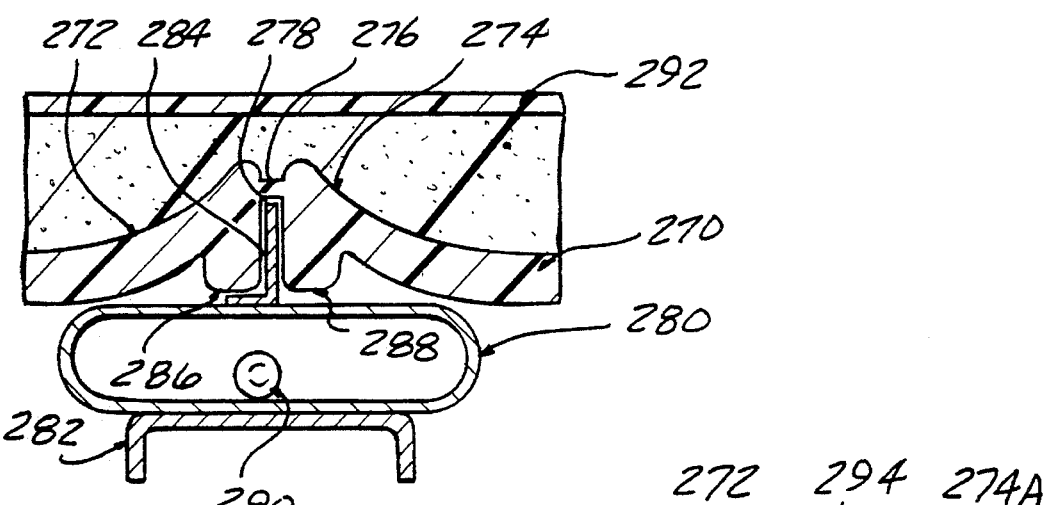
FIG·15A
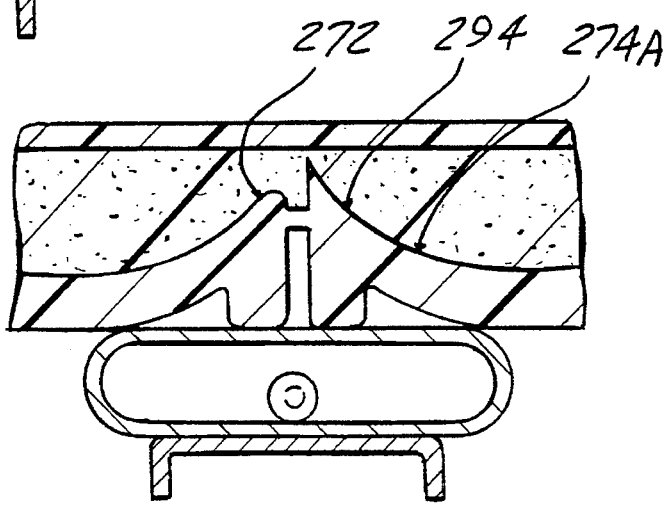
FIG·16

METHOD AND ARRANGEMENT FOR FORMING AN AIR BAG DEPLOYMENT OPENING

BACKGROUND OF THE INVENTION

1. Field of the Invention

This invention concerns installations of "air bag" safety systems in passenger compartments of vehicles adopted to transport passengers such as cars and trucks.

2. Description of the Prior Art

"Air bag" safety systems comprise an inflatable enclosure stored in folded condition in a storage site within a passenger compartment, which is very rapidly inflated when a severe vehicle collision is detected so as to be deployed in a position to cushion the impact of the driven or passenger against the interior surfaces.

The storage site for the folded air bag is usually covered with a deployment door to be protected, and in many designs, the deployment "door" is forced open by the inflating air bag.

The level of resistance to opening the door affects the performance of the air bag system since it may affect the time required for full deployment. At the same time, the door must be secured against tampering.

U.S. Pat. No. 4,893,883, issued on Jan. 16, 1990, for "Closure for an Air Bag Deployment Opening"; and U.S. Pat. No. 4,989,896 issued on Feb. 5, 1991, for "Double Door Closure for an Air Bag Deployment Opening" show locking tabs which are sheared open under the pressure of the inflating air bag, allowing the deployment door or doors to hinge open. See also U.S. Pat. No. 5,082,310 issued on Jan. 21, 1992, for "Arrangement for Providing an Air Bag Deployment Opening".

It has heretofore been proposed to design the trim piece behind which the air bag is stored so that the deployment door is not visible. The trim piece structure must at least in part be fractured along a door seam to allow the air bag to deploy out into the passenger compartment.

In an effort to minimize the force required, it has heretofore been proposed to use linear energy generating elements, such as detonator cord, pyrofuse, explosive coatings, etc. to cut through the substrate and/or skin and foam just prior to air deployment, and form a door through which the air bag can deploy.

See U.S. Pat. No. 5,080,393 issued on Jan. 14, 1992, for "Method and Apparatus for Forming an Air Bag Deployment Opening"; U.S. Pat. No. 5,217,244 issued on Jun. 8, 1993, for "Arrangement for Forming an Air Bag Deployment Opening"; and U.S. Pat. No. 4,991,870 issued on Feb. 12, 1991, for "Method and Arrangement for Forming an Air Bag Deployment Opening in an Auto Interior Trim Piece" for examples of this arrangement.

In each of these cited patents, the energy releasing element direct heat and pressure onto the trim piece structure to cut at least the overlying skin.

Such direct release of energy requires that the element be carefully designed in order that the outward blast does not present a hazard to any person in the passenger compartment.

The object of the present invention is to provide an arrangement for creating a deployment opening in a trim piece which does not involve a visible deployment door and which does not involve directing explosive or heat energy through the trim piece and into the passenger compartment.

SUMMARY OF THE INVENTION

These and other objects of the present invention which will become apparent upon a reading of the specification and claims are accomplished by interfitting a separate door substrate panel in a deployment opening in a trim panel, both overlain with foam and a decorative covering layer to create an invisible seam opening.

A linear element is mounted in a pattern forming three or more sides of the deployment opening lying beneath the covering layer. The linear element has a cutting edge displaceable separately and independently of the air bag deployment by deployment of internal pressure, such as from ignition of a contained pyrotechnic charge. The movement of the cutting edge rather than the direct effects of the energy released pyrotechnic charge itself, the cutting edge causing shearing of the trim piece structure along its length. Pressure, heat energy, or the products of the chemical reaction are not released from the linear element, with the movement of the cutting edge soley relied on to mechanically sever the trim piece skin and foam along the deployment door seam.

The linear element may be installed in several ways, including on three sides of a frame surrounding the door substrate panel; or, on three sides of the door substrate panel itself; or on a separate membrane layer assembled to the door substrate panel.

The frame and door substrate panel (and membrane) may also form part of the air bag assembly, attached to the air bag stowage canister, with the instrument panel skin and foam applied over both items after assembly.

The linear element itself can take a number of forms, the simplest being a flattened tube of aluminum or plastic containing a pyrotechnic charge which when discharged causes the tube to very rapidly expand to a more rounded shape. The exterior of the tube can have a discrete cutter mounted thereto which is driven by the tube expansion to cut the trim piece covering layer. Alternatively, the tube may itself be provided with an integral cutting edge feature created by the shape of the tube. The integral cutting edge is driven out as the tube expands initially, but which may flatten out as the tube is fully expanded so as to not present a cutting edge towards the passenger compartment after penetration of the covering layer.

The expanding tube may also be positioned beneath the door substrate panel edge, with the door panel edge pushed through the covering layer by the expansion tube. Similarly, a linear pyrotechnic charge can also be installed within a separate dynamic dart cutter blade, enclosed within a channel, ignition of the charge forcing the cutter blade out of the channel to cut the covering layer.

One advantageous arrangement of this latter arrangement comprises a dart cutter element driven outwardly from the channel by the linear pyrotechnic charge, with the sides of a widened base sliding against the channel sides. The channel and dart cutter may be molded as one piece with a narrow integral joining section between the base portion and the channel walls which seals the gap at the initial ignition of the charge.

Various compressible seals can also be employed between the dart cutter and channel, with the seals creating a retraction of the dart cutter after completion of the cutting movement.

A separate peaked piece comprising a cutting edge can also be pushed out by a channel, containing the linear charge via an intervening resilient tension legs, with the tensioned legs also providing a retracting force after penetration of the covering layer.

DESCRIPTION OF THE DRAWINGS

FIG. 1 is a fragmentary sectional view taken through an instrument panel air bag installation according to a first embodiment of the invention.

FIG. 1A is a diagrammatic representation of the door pattern of the embodiment of FIG. 1.

FIG. 6 is a fragmentary sectional view taken through an instrument panel air bag installation according to a sixth embodiment of the invention.

FIG. 9 is a fragmentary sectional view of another form of the expandable linear element used in the arrangement according to the invention.

FIG. 15 is a fragmentary sectional view of an air bag installation showing yet another installation of the linear pressure cutter element.

FIG. 15A is an enlarged view of a portion of the section shown in FIG. 15.

FIG. 16 is an alternate form of the installation shown in FIGS. 15, 15A.

DETAILED DESCRIPTION

Figure 5:
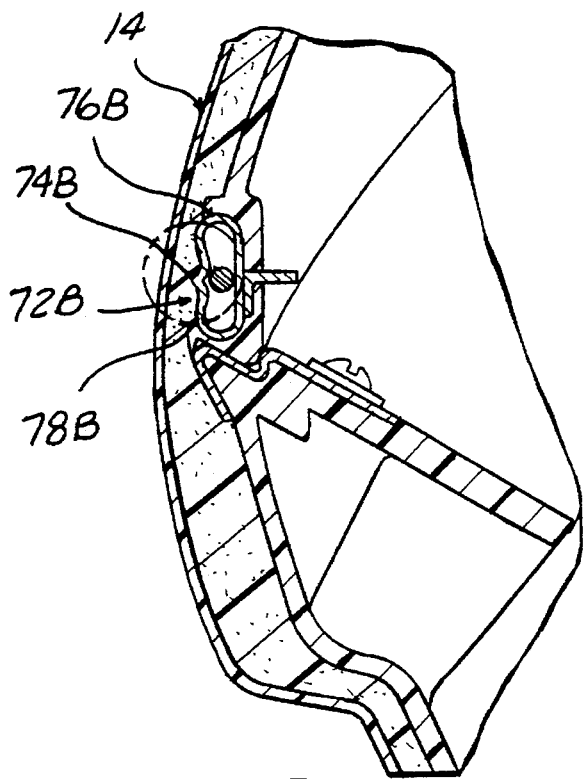
FIG. 5 is a fragmentary sectional view taken through an instrument panel air bag installation according to a fifth embodiment of the invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIG. 1, the present invention is concerned with the installation of a stored air bag 10 behind a trim piece 12 located within the passenger compartment of an passenger carrying vehicle. The trim piece 12 shown is comprises an instrument panel having a smoothly extending outer covering skin typically of vinyl plastic which overlies a foam layer 16.

An instrument panel substrate 18 extends beneath the foam and covering layers 14, 16 and is formed with an opening 20 into which is fit a door substrate panel 22.

The covering layer 14 which is constructed of a tough plastic such as vinyl and the underlying foam layer 16 overlie the instrument panel substrate 18 and interfit substrate door panel 22 in a smooth uninterrupted expanse such that the presence of the opening 20 and substrate door panel 22 are invisible from the externally instrument panel 12.

The instrument panel substrate 18 and door substrate panel 22 may be constructed of a suitable strong plastic such as molded polyolefin in the manner well known to those skilled in the art.

The door substrate panel 22 is generally rectangular (see FIG. 1A), and is free along three sides but hinged along the rear side by having a integral hinge flange 24 secured to an in turned wall 26 of the instrument panel substrate 18, as by means of screws 28 and a retaining plate 30.

The free sides of the door substrate panel 22 have inturned portions 32 abutting in the closed position the portions 34 of the instrument panel 18 adjacent the perimeter of the opening 20. This enables door substrate panel 22 to resist inward pushing pressure imposed thereon for the exterior, but is otherwise free to move outwardly to hinge open along the rear integral hinge flange 24.

The substrate door panel 22 is also provided with suitable stiffening ribs 36 extending from the front to the rear thereof.

Portions of the instrument panel substrate 18 defining the opening 20 are covered with a metal stiffening frame 38, secured by means of screws 40 and by the screws 28 and retaining plate 30 holding the hinge flange 24, of the door substrate panel 22.

The metal stiffening frame 38 is desirable for stiffening and stabilizing the instrument panel regions adjacent the opening 20 as described in further detail in copending U.S. application Ser. No. 08/132,150 filed on Oct. 5, 1993.

The air bag 10 is mounted within a space 42 defined by a structural panel 44 supporting the instrument panel 18.

According to the concept of the present invention, a linear element 46 is mounted atop the metal frame 38 and adjacent the opening 20 of the instrument substrate panel 18. The linear element 46 is designed to cause a cutting edge 48 to be driven outwardly so as to penetrate the covering layer 14 in a three sided pattern.

The linear element 46 is confined between a knee 50 formed in the metal frame 38 and a projecting rib 52 along the sides of the door substrate 22, the rib 52 and knee 50 being inclined towards each other to form a confining channel space 54.

The linear element 46 is defined by an enclosed shaped tubing 56 containing a pyrotechnic charge 58 such as ITLX 2000 linear ignition material available from Explosive Technology of Farifield, Calif.

The ignitor 62 for the pyrotechnic charge 58 is integrated into the air bag triggering circuitry 60 which generates a signal at the time that the air bag deployment is to occur which sets off an ignition 62 associated with the pyrotechnic charge 58. Upon ignition, the pyrotechnic charge very rapidly propagates along the enclosing tube 56. The enclosing tube 56 is partially flattened along the outer sides as shown and hence is capable of a substantial expansion under the pressure developed by the pyrotechnic charge 58 which causes the sharp cutting edge 48 formed on the outer side of the tube 56 to be driven outwardly a sufficient distance to penetrate the tough covering layer 14. This occurs extremely rapidly and in sufficient time such that the inflating air bag will encounter the ribbed door substrate panel 22 immediately after or simultaneously with penetration of the skin 14 with the cutting edge 48. The projecting lip 52 of the door substrate panel 22 also acts to assist in the penetration of the overlying foam layer 16 and covering layer 14.

Accordingly, the resistance to hinging open of the substrate panel 22 is greatly reduced such that the deployment of the air bag is not compromised.

In the embodiment according to FIG. 1, the linear element 46 is mounted on the frame 38, and is therefore adapted to "H" pattern door openings shown in FIG. 1A. The cutting edge 48 remains present after the tube 56 expands.

Figure 2:
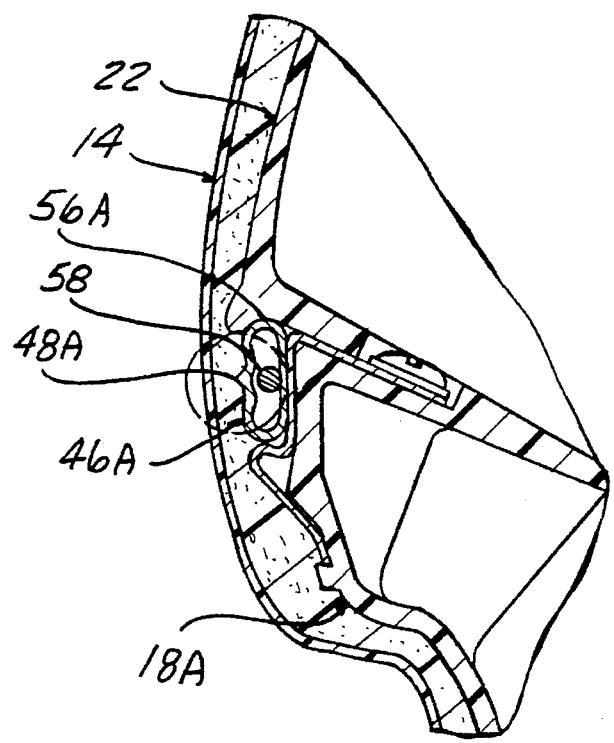
FIG. 2 is a fragmentary sectional view taken through an instrument panel air bag installation according to a second embodiment of the invention.

FIG. 2 illustrates the use of a expandable tube type linear element 46A incorporating a disappearing cutting edge in the flattened condition of the tube 56A.

The outer portion thereof is formed in a convoluted shape with a peaked section 48A at the center. Upon discharge of the pyrotechnic charge 58, the tube 56A expands and assumes a generally rounded shape. The perimeter of the tube 46A flattens out such as to eliminate the cutting edge 48A after penetration of the covering layer 14.

Accordingly, the hazard potential represented by the presence of the outwardly driven cutting edge 48A is reduced.

Figure 3:
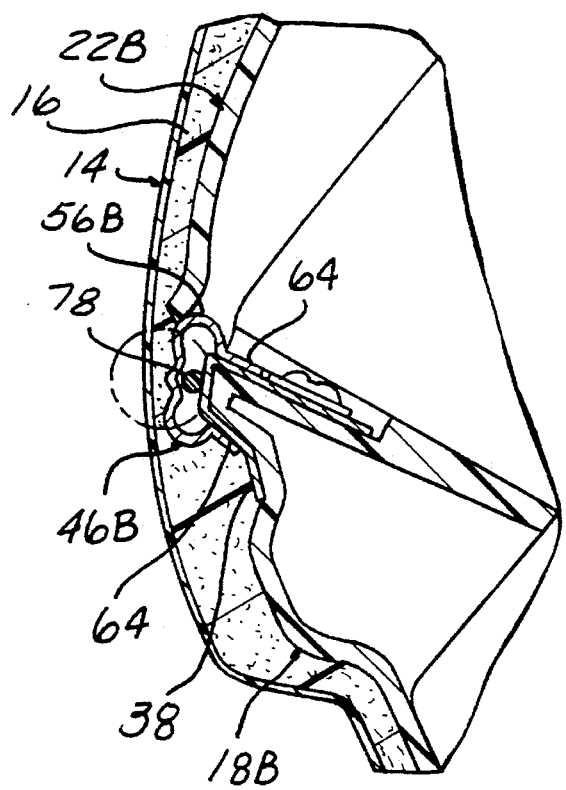
FIG. 3 is a fragmentary sectional view taken through an instrument panel air bag installation according to a third embodiment of the invention.

FIG. 3 illustrates an alternate construction for the linear element 46B in which the enclosing tube 56B is constructed in an open shape having sides 64 which straddle the exterior of the metal frame 38 and are secured thereto with suitable fasteners (not shown).

Figure 4A:
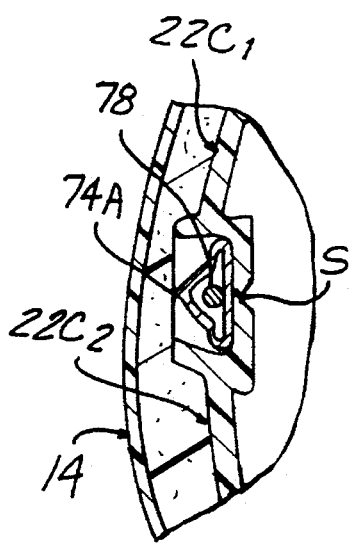
FIG. 4A is a fragmentary sectional view of abutting door panels having grooved portions mounting a linear element as employed in the invention.
Figure 4:
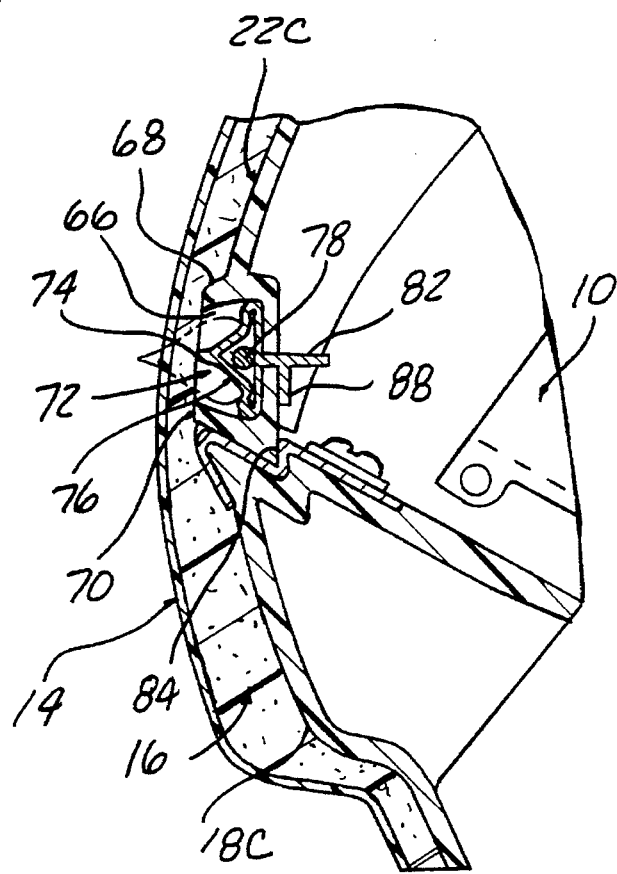
FIG. 4 is a fragmentary sectional view taken through an instrument panel air bag installation according to a fourth embodiment of the invention.

FIG. 4 illustrates a differing version of the arrangement in which the door panel 22C is itself formed with a perimeter channel opening 66 defined by side walls 68 and 70 integrally molded therein.

The linear element 72 is disposed in the channel 66, the linear element 72, in this instance, being similar to the linear element shown in FIG. 1 in overall shape having a peaked piercing edge 74 defined on a confining tube 76 of thin walled aluminum or plastic.

The tube 76 is flattened on its outer sides and contains a pyrotechnic charge 78. A pair of edges 80 and 82 extend through the door substrate panel 22C through the bottom wall defining the channel 66 to secure the linear element 72 within the channel 66. The sides 68, 70 also are inclined towards each other somewhat, to produce a confining effect on the tube 76. After ignition of the pyrotechnic charge 78, the edge 74 is driven outwardly by expansion of the tube 76 to penetrate the vinyl covering layer 14 passing through the foam layer 16 as shown in FIG. 4.

The outer channel side 70 of the door substrate panel 22C abuts against a knee 84 on a metal reinforcing frame 86 which in turn is interfit to the instrument substrate 18C to the shape of the instrument panel substrate 18C. Thus, the hinging action of the door substrate panel 22C is allowed while being able to resist inward pressure exerted from outside the instrument panel.

The mounting of the linear element 72 within the door substrate panel allows deployment door substrate panel patterns other than the "H" pattern of FIG. 1A, i.e, for example an "X" pattern as the channel 66 can be formed along the seam between the adjacent door panels as shown in FIG. 4A with the substrate panels 22C1, 22C2 having a joining seams which is preweakened by a reduced thickness and/or slots extending along the joining seam. Thus, the driven cutting edge 74A is separate from the air bag relied on to penetrate the covering layer 14 and the air bag pressure used only to fracture the preweakened seams between the adjacent door substrate panels 22C1, 22C2.

The abutment of the substrate panel 22C serves to absorb the reaction of driving of the cutting edge 24A.

FIG. 5 shows the door mounting arrangement shown in FIGS. 4 and 4A utilizing a linear element 72B confined in a tube 76B having a disappearing cutting edge 74B.

The generally flattened shape of the tube 76B has a corrugated shape on its outward side which forms the cutting edge 74B. Upon ignition of the charge 78B and expansion of the tube 76B, the cutting edge 74B penetrates the covering layer 14 but then disappears as the tube fully expands to a generally rounded shape as indicated in phantom FIG. 5.

FIG. 6 shows another arrangement in which the air bag canister 90 is formed of a cast construction having a retaining channel 92 formed therein, within which is disposed a linear expansible tube element 94 which extends along the free sides of a substrate door panel 96 interfit within an opening of the instrument panel substrate 98.

The substrate panel 96 is formed with the hinging side 100 along one side and is free from attachment to the instrument panel substrate 98 along the other three sides.

The door substrate panel 96 overlies the channel 92 formed in the canister casting 90 and is formed with a cutting edge 102 facing outwardly and disposed over the tubular expansion element 94.

Accordingly, when the charge 104 is ignited and the flattened linear tubular element 94 is very rapidly expanded to its fully rounded condition, the door panel substrate 96 is driven outwardly forcing the cutting edges 102 through the covering layer 14 allowing the deployment door substrate 96 to be forced open by the inflation of the air bag (not shown)

without significant resistance from the covering layer 14.

In constructing the arrangement according to FIG. 6, the surrounding frame 106 is preassembled to the door substrate panel 96 with that subassembly then assembled to the instrument substrate panel 98. The covering and foam layers 14, 16 are formed by an in situ molding bonding process. The air bag storage canister 90, which can be separately manufactured, assembled, and tested with the linear element 94, is then assembled to the instrument panel assembly by means of flanges 108, 110 and suitable fasteners as shown.

Alternatively, the frame 106 can have the element 94 mounted thereto, and preassembled to the air bag canister 90. The door substrate panel 96, instrument panel substrate 98 and covering layers will be bonded in the molding process to form a composite, such that the frame—charge—air bag cannister can be assembled to that composite.

This approach has the advantage of allowing manufacture and testing of the safety related air bag initiators and linear element 94 separately from the manufacturing of the door substrate panel and instrument panel.

Figure 7:
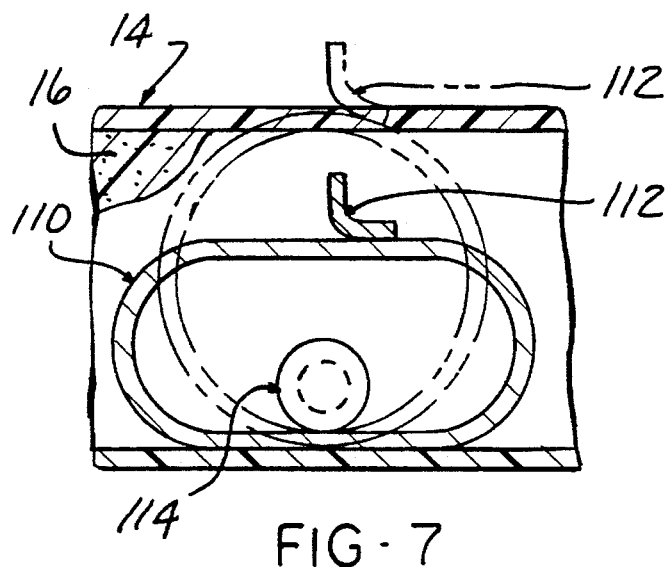
FIG. 7 is a fragmentary sectional view of one form of the expandable linear element used in the arrangement according to the invention.

FIG. 7 shows the installation of a linear element expansible tube element 110 which is provided with a rigid discrete cutter 112 welded to the outside edge adjacent the vinyl and overlying foam layers 14 and 16. This embodiment envisions a tube of thin-walled aluminum, i.e., with 0.031" wall thickness and a cutting 112 formed of a right angle piece also aluminum. In this arrangement, the top of the cutting edge 112 is disposed approximately 0.080" beneath the inside surface of the vinyl layer 14.

Upon ignition of the pyrotechnic charge 114, the rounding of the tube, which is 0.625" wide when flattened as shown, would drive the edge 112 approximately 0.125"

Figure 8:
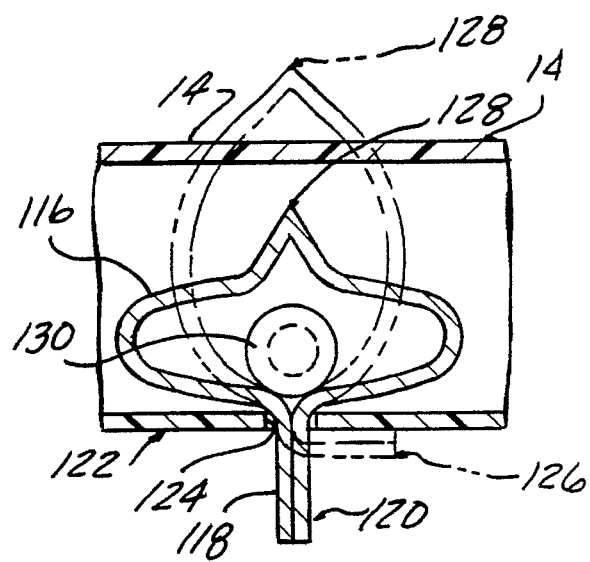
FIG. 8 is a fragmentary sectional view of another form of the expandable linear element used in the arrangement according to the invention.

FIG. 8 shows another form of linear tubular element 116 having projecting flanges 118 and 120 which may be disposed into through the substrate layer 122 through a slot 124. The flanges 118, 120 are preferably welded together and formed over at least in sections at 126 to be secured to the substrate panel 122. The element 116 is generally oval in cross sectional shape and formed with a peaked center portion on its outwardly facing side to provide a cutting edge 128.

Upon ignition of the pyrotechnic charge 130, the cutting edge 178 is driven through the covering layer 14 but thereafter flattens out to some extent to present a duller edge to the interior of the passenger compartment.

Figure 8A:
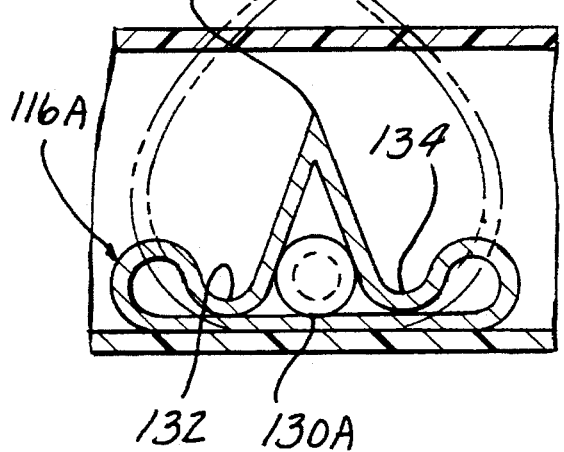
FIG. 8A is a fragmentary sectional view of another form of the expandable linear element used in the arrangement according to the invention.

FIG. 8A shows a variation of this design in which the linear element 116A is substantially completely flattened along localized areas 130, 132 to provide a more pronounced peaked central portion formed with the cutting edge 128A.

Ignition of the charge 130A drives the cutting edge 128 outwardly through the vinyl layer 14 with thereafter more rounded shaping of the linear element 116A dulling the cutting edge 128 to a great extent.

Figure 8B:
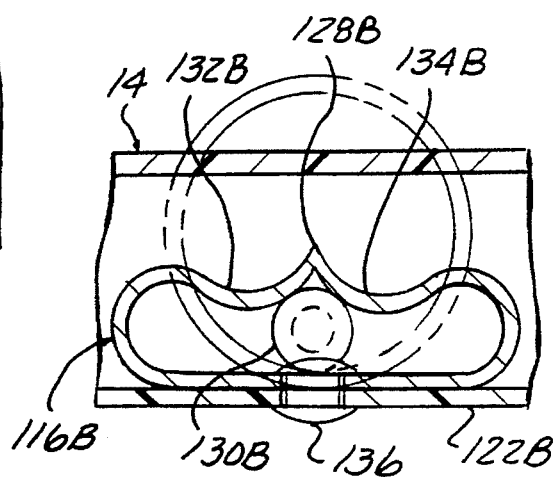
FIG. 8B is a fragmentary sectional view of another form of the expandable linear element used in the arrangement according to the invention.

FIG. 8B shows a further variation where the linear element 116B has less pronounced flattening in the regions 132B, 134B producing a less pronounced peak formed with the cutting edge 128B. This flattening allows a complete rounding of the linear tubular element 116B upon ignition of the pyrotechnic charge 130B such as to provide complete elimination of the cutting edge 128B after penetration of the covering layer 14.

In this instance, the linear element 116B is shown riveted with rivets 136 to the substrate 122B.

FIG. 9 shows a different arrangement than the closed tubular form of the linear element in which a open channel element 138 is provided mounted to the instrument panel substrate 140 with a pinched together roll formed enclosure 142 disposed within the channel 138.

A reversely bent portion 144 provides a cutting edge at its outer surface which is disposed even with the outermost wall 146 of the channel 138. The charge 150 is disposed in a space 152 formed by pinching together of the sides of the roll formed enclosure 142.

Upon ignition of the pyrotechnic charge 150, the edge 144 is driven outwardly to penetrate to covering layer 14.

Figure 10:
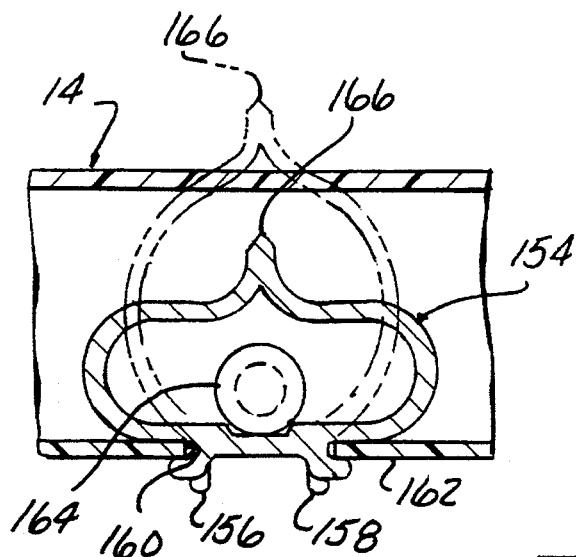
FIG. 10 is a fragmentary sectional view of another form of the expandable linear element used in the arrangement according to the invention.

FIG. 10 shows an aluminum extrusion form of a linear element 154 having integral edges 156 and 158 inserted into an opening 160 of the substrate panel 162 on which the linear element 154 is mounted.

The edges 156, 158 may be staked over at local areas to secure the tube to the substrate 162. Ignition of the linear charge generates pressure rapidly driving the cutting edge 166 on a central portion through the vinyl covering layer 14 as in the above described embodiments.

Figure 10A:
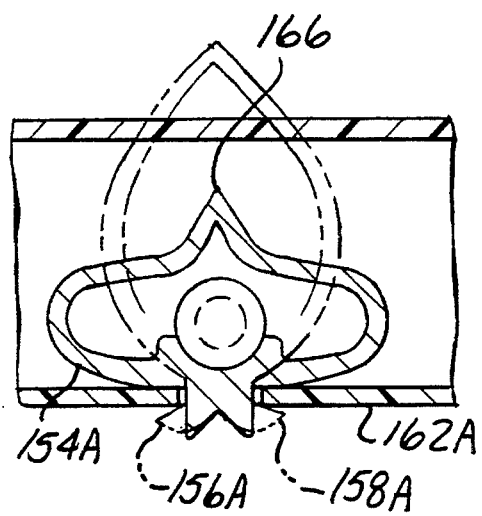
FIG. 10A is a fragmentary sectional view of another form of the expandable linear element used in the arrangement according to the invention.

FIG. 10A shows a variation in the shape of the extrusion 154 both as to the cutting edge 166A and the mounting legs 156A and 158A.

Figure 10B:
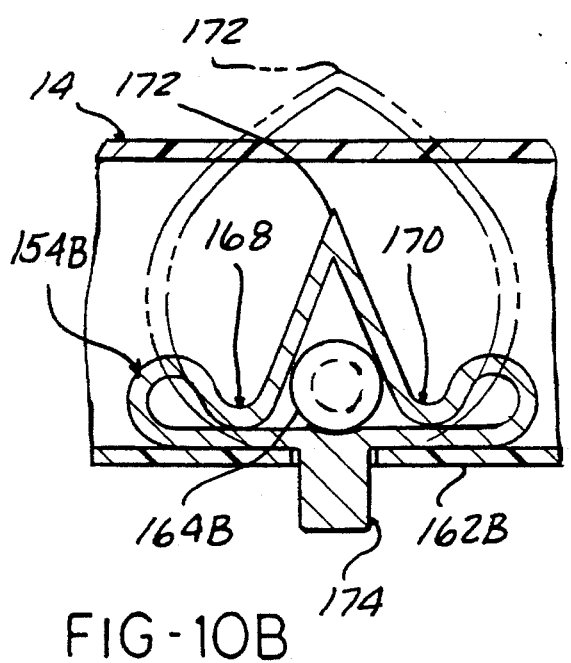
FIG. 10B is a fragmentary sectional view of another form of the expandable linear element used in the arrangement according to the invention.

FIG. 10B shows yet another variation of the linear element 154B comprised of an enclosed aluminum extrusion in which the shape is considerably flattened in the areas 168, 170 on either side of a much more pronounced peaked segment defining a cutting edge 172.

Ignition of the pyrotechnic charge 164B causes driving of the cutting edge 172 through the covering layer 14 with a considerable dulling of the cutting edge 172 after expansion of the extrusion shape.

A rib 174 on the opposite side from the cutting edge 172 passes through the substrate 162B for securement thereto.

Figure 10C:
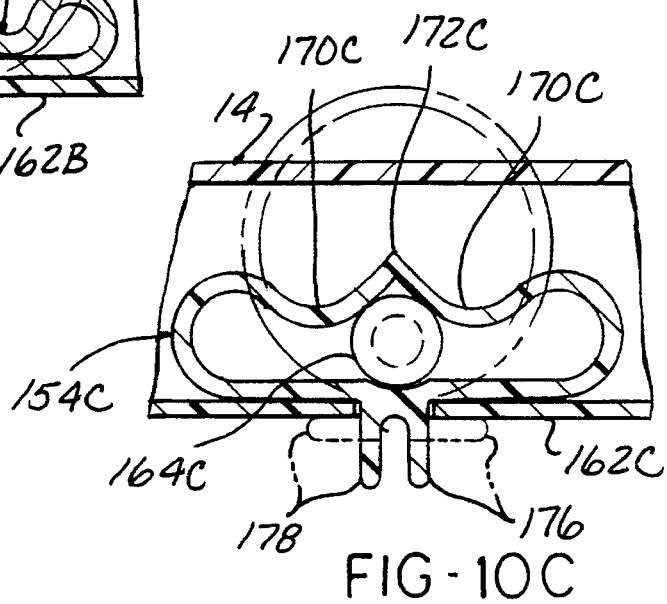
FIG. 10C is a fragmentary sectional view of another form of the expandable linear element used in the arrangement according to the invention.

FIG. 10C shows a less pronounced flattening in the regions 170C of the linear element 154C such that a smaller peak defines the cutting edge 172C as formed. The shape of the linear element 154C is such that upon discharge of the pyrotechnic 164C the element 154C assumes a completely rounded shape which occurs after penetration of the cutting edge 172C with the covering layer 14. The cutting edge 172C thus disappears after penetration to eliminate any hazard to an occupant in front of the deployment opening.

A pair of ribs 176, 178 is provided in the opposite side of the linear element 154C inserted into an opening in the substrate panel 162C and folded over as shown to secure the linear element 154C thereto.

Figure 11A:
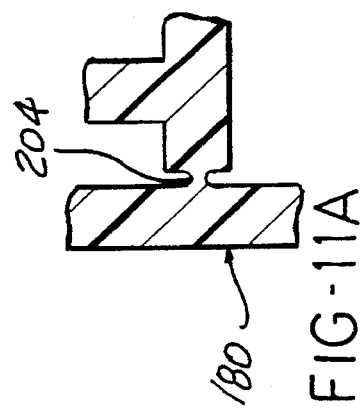
FIG. 11A is an enlarged fragmentary view of a portion of the element shown in FIG. 11.
Figure 11:
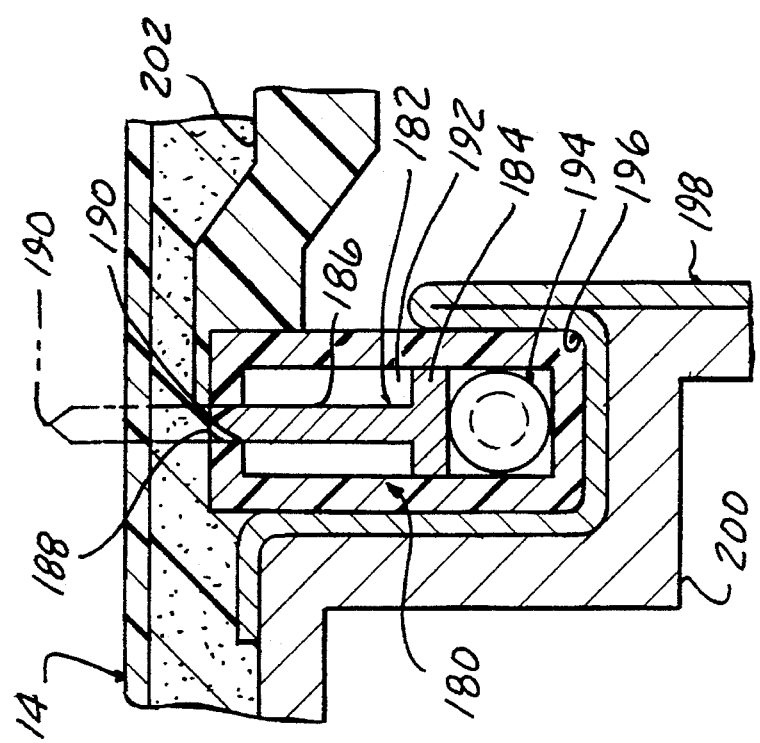
FIG. 11 is a fragmentary view of a pressure driven dart cutter version of the linear pressure cutter element used in the air bag installation of the present invention.

FIG. 11 illustrates a dart cutter form of the linear element in which a channel 180 has a dart cutter 182 slidably disposed having a T-shaped cross section shape with a base portion 184 and a rib portion 186 form protruding through an opening 188 in the channel section 180.

The rib section 186 formed with a sharpened linear cutting edge 190 on the portion facing the covering layer 14. The base portion 184 is fit to the interior width of the channel of the opening 192 in the channel section 180.

A pyrotechnic charge 194 is located within the channel opening lying beneath the base portion 192 of the dart cutter 182, such that upon ignition the dart cutter 182 is driven outwardly to penetrate the covering layer 14. The channel 180 is fit within a groove 196 formed in a stiffener frame 198 attached to the instrument panel substrate 200. The frame 198 surrounding the opening in the door panel substrate 202 to which the door panel substrate 202 is fit having an edge resting against one side of the channel 180 as shown.

The channel 180 and dart cutter 186 can be constructed of aluminum or alternatively of an aluminum extrusion or alternatively of a thermoplastic extrusion, as indicated in FIG. 11A, in which the base portion 184A is formed integrally with the adjacent walls of the channel 180 such as to have a small connecting web 204. The slight thickness 204 provides an initial seal after discharge of the pyrotechnic charge 194, but separates under the pressure developed thereby.

Figure 12:
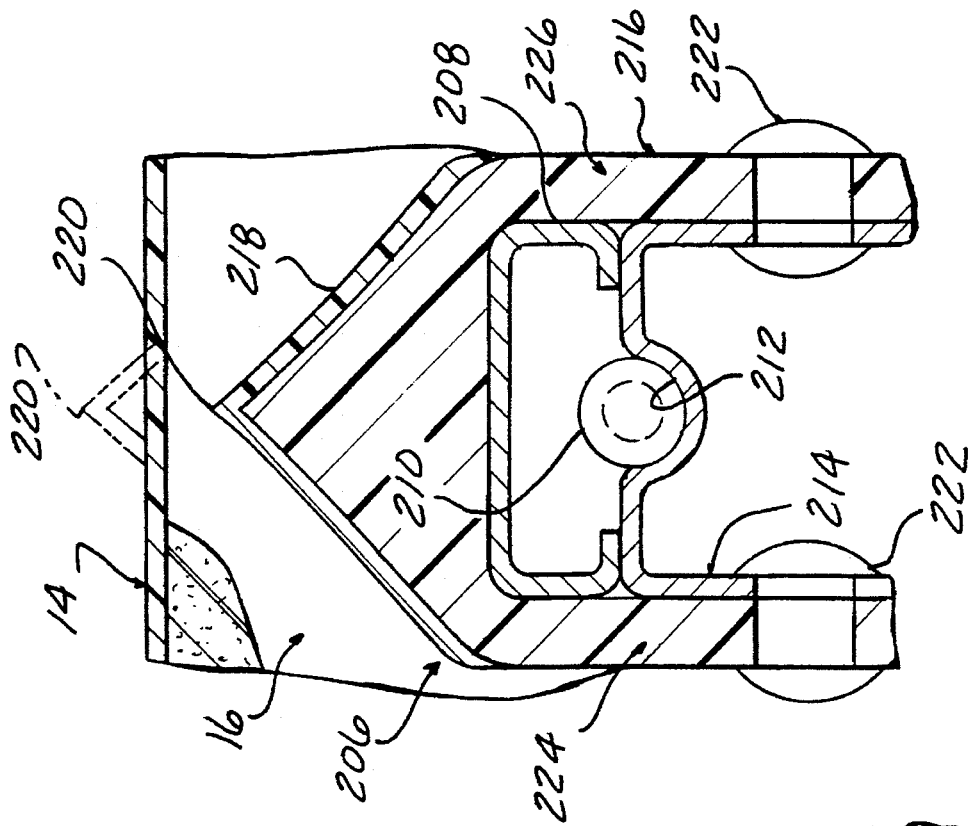
FIG. 12 is a fragmentary sectional view of another version of the dart cutter form of the linear pressure cutter element shown in FIG. 11.

FIG. 12 shows yet another variation of the linear element 206. In this version, an aluminum extrusion 208 formed into a channel is positioned over the pyrotechnic charge 210 mounted within a groove 212 formed in the frame 214 affixed to a resilient thermal plastic cap 216. The cap 216 is covered with a harder reinforced material layer 218 with a peak forming a cutting edge 220 directed towards the inside of the covering layer 14.

The cap 216 affixed to the frame 214 by means of suitable fasteners such as the rivets 222 shown. In this construction, the ingition of the pyrotechnic charge 210 causes the aluminum extrusion 208 to be displaced towards the covering layer 14, stretching the thinner side walls 224, 226 of the cap 216 and causing the cutting edge 220 to be driven to penetrate the covering layer 14. The side walls 224, 226 seal off the opening formed within the aluminum extrusion channel 208 preventing the escape of gas.

The stretched side walls 224, 226 then relax, retracting the cutting edge 220.

Figure 12A:
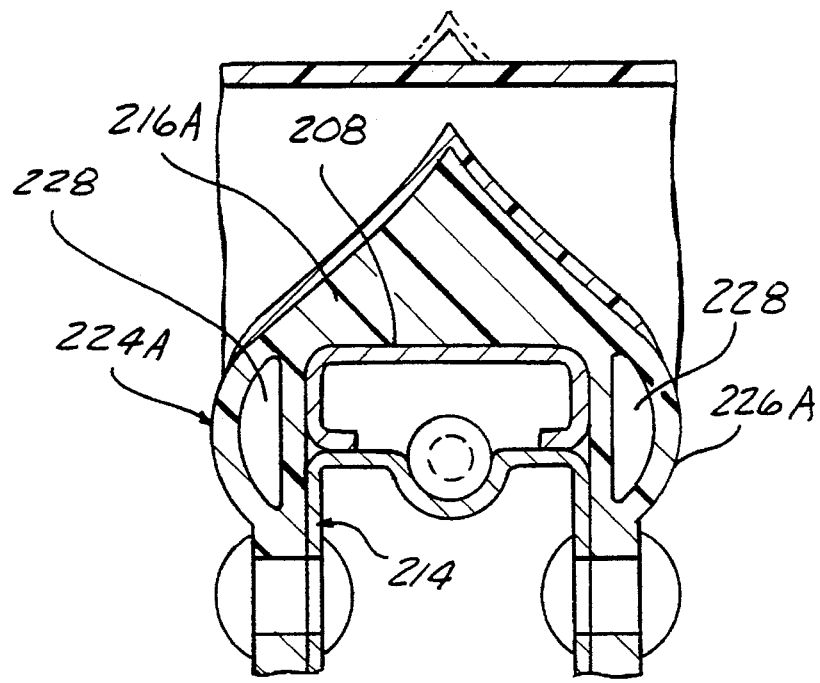
FIG. 12A is a fragmentary sectional view of a variation of the linear element shown in FIG. 12.

FIG. 12A shows a variation of this version in which the cap member 216A is formed with hollows 228 proving the resilience of the side walls 224A, 226A.

Figure 13:
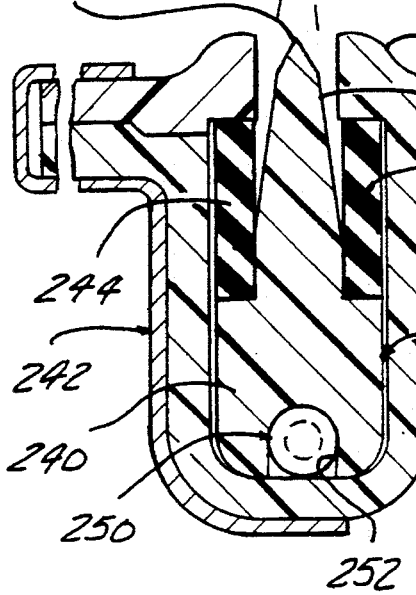
FIG. 13 is a fragmentary sectional view of yet another form of the dart cutter form of the linear element.

FIG. 13 shows still another form of the linear element 230 in which a dart cutter 232 of a thermal plastic material is slidably disposed within an enclosing channel 234 also formed of plastic material. A dart cutter 232 is formed with a rib 236 having a peaked portion forming a cutting edge 238.

A base portion 240 is of wider width such as to be slidable in the interior of the channel 234. A pair of seals 244, 246 of rubber or other elastomeric material are provided, seated on the outward face of the projecting side ways base portion 240 at one end, and at the other end against an overlying shoulder defined by the door substrate panel 248. The pyrotechnic charge 250 when ignited will generate pressure rapidly driving the dart cutter 232 outwardly causing the cutting edge 238 to penetrate the overlying covering layer 14.

Compression of the rubber walls strips 244, 246 provides both a seal and a rebound or retraction of the dart cutter 232 after penetration to thus eliminate the projecting cutting edge 238 as a potential hazard to an occupant of a passenger compartment.

Figure 13A:
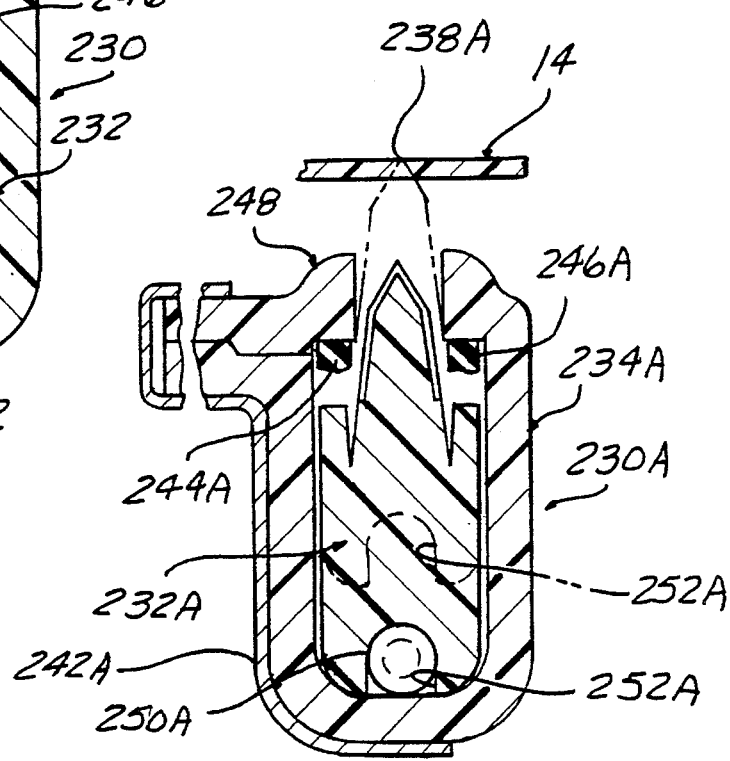
FIG. 13A is a fragmentary sectional view of a variation of the form of the dart cutter version linear element shown in FIG. 13.

FIG. 13A shows a variation of the form shown in FIG. 13 in which the dart cutter 232A is formed with integral compressible seal portions 244A, 246A which are seated against the door panel substrate 248A positioned across the open side of the channel 234.

The pyrotechnic charge 250A nested at the bottom of a channel 234A within a groove 252A at the base of the bottom of a base portion 232A drives the cutter compressing the dynamic seal portions 244A, 246A to allow outward driving of the tip 238A and penetration of the covering layer 14 after which the compressible seal portions 244A, 246A will cause rebounding retraction of the cutting edge 238A.

Figure 14:
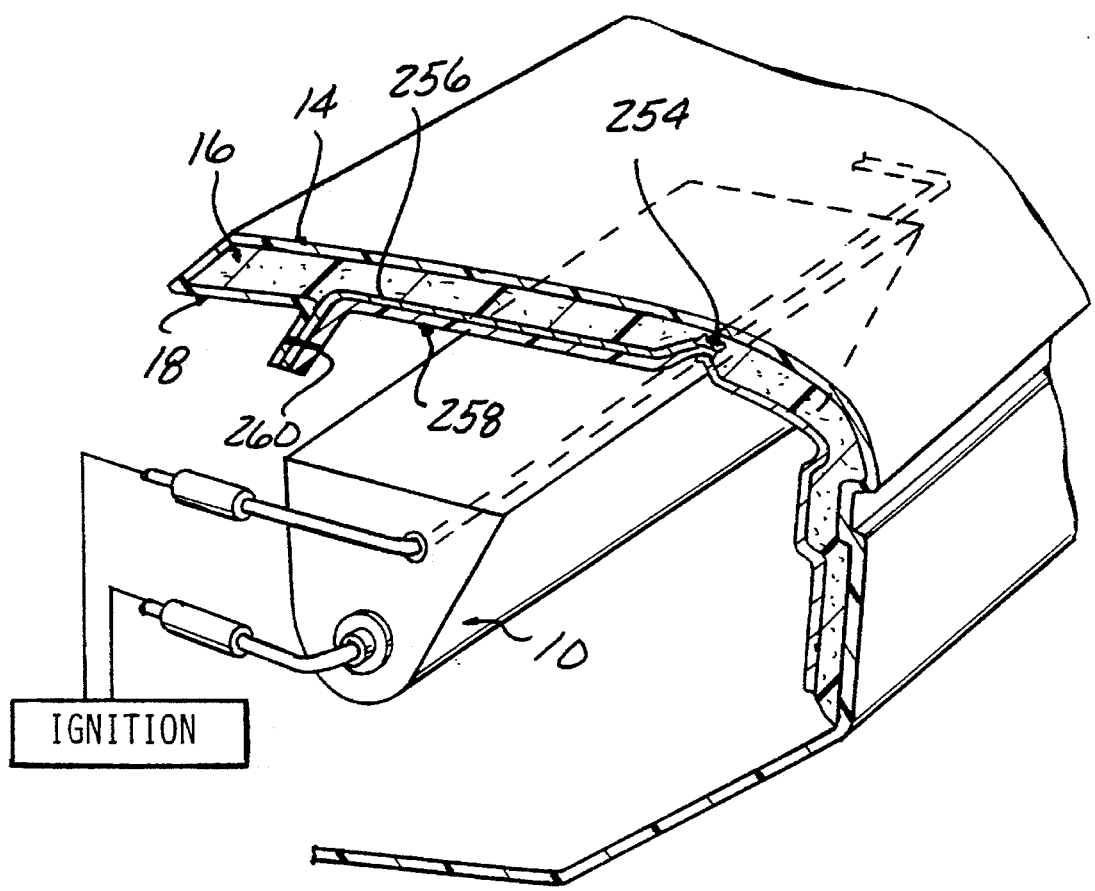
FIG. 14 is a perspective partially sectional view of an air bag installation showing a linear element mounted on a separate carrier layer.
Figure 14A:
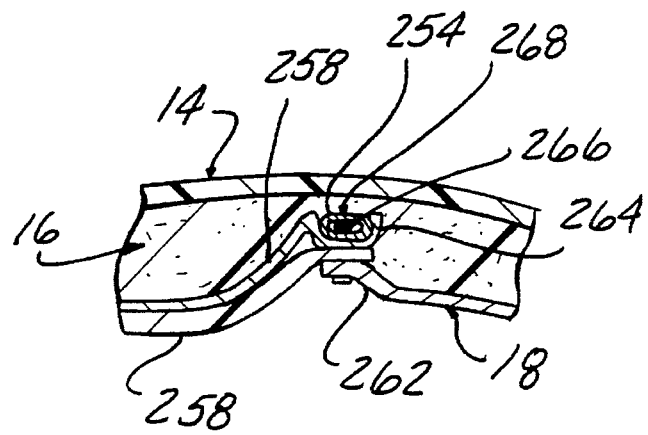
FIG. 14A is an enlarged view of a portion of FIG. 14.

As seen in FIG. 14 and 14A, the expandable tube element or other forms of the pressure driven cutting assembly as described herein can be mounted to a separately assembled membrane layer 256 which is assembled to overlie the outside of the door substrate panel 258 beneath the foam layer 16 and the covering layer 14.

The door substrate panel 258 has a hinge flange 260 attached to the adjacent portion of the instrument panel substrate 18 on one side of the door panel which extends outwardly to a point more closely adjacent the inside surface of the covering layer 14.

The membrane layer 258 is provided with a rounded edge on the three unconnected sides of the door frame. The outwardly protruding lip of the substrate panel 258 overlying a similarly outwardly projecting lip portion of the portion 262 of the instrument panel substrate 18 adjacent the three free sides of the substrate door panel 258.

The membrane panel 258 is provided with a grooved edge 264 extending along the three free sides having a trough shape such as to enable nesting and confinement of the expansible tube linear element 254. The expansible tube 254 has a charge 266 confined therein which is connected to an ignitor 268 which is connected to the air bag ignition circuit such as to be activated at the time the air bag system is to be deployed.

Expansion of the element 254 drives a cutting edge 268 so as to penetrate the covering layer 14.

FIG. 15, 15A shows a door substrate panel 270 having an edge perimeter formed with outwardly inclined rounded edge ribs 272, 274 joined by a thin frangible connecting bridge 276, an intervening groove 278 creating the reduced thickness of bridge 276.

A flattened tube 280 is mounted to a door frame 282 and has a cutter 284 attached to the outer side received in the groove 278.

The outwardly inclined ribs 272, 274 create a spreading effect when the lower inside portions 286, 288 are pushed out by expansion of the tube 280 when charge 290 is ignited, creating a stretching tension of the skin 292.

After the bridge 276 fractures, the sharpened edge of cutter 284 contacts the tensioned skin 292, creating an immediate severing.

FIG. 16 shows a cutter edge integrally formed on one of the ribs 274A.

Figure 17:
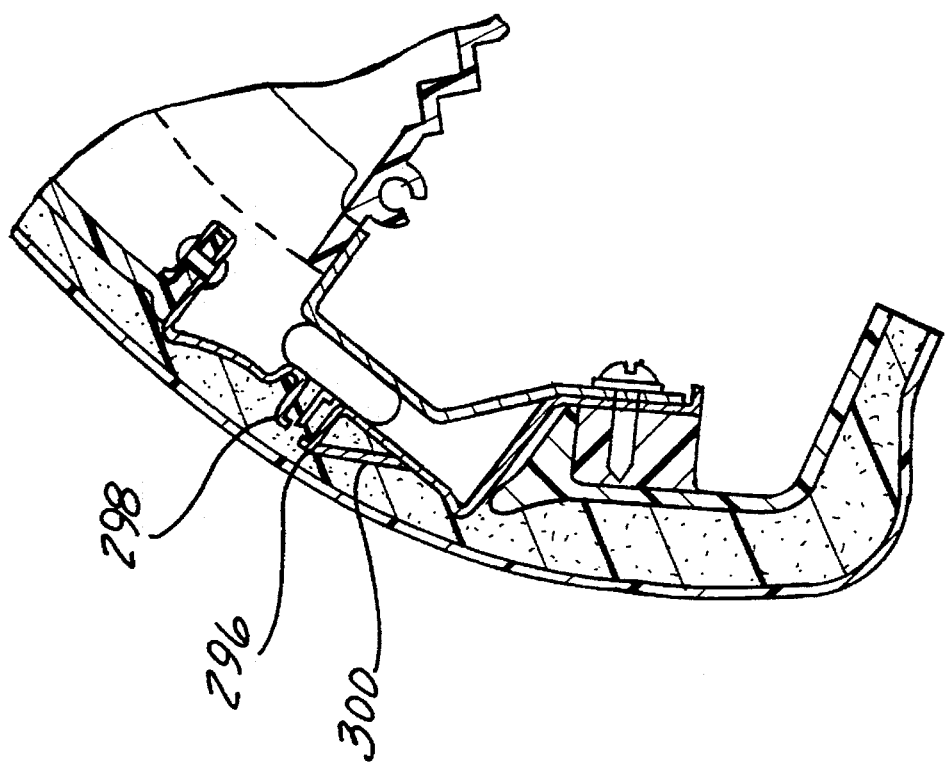
FIG. 17 is a fragmentary sectional view of an air bag installation having another installation of the linear pressure element.

FIG. 17 shows metal ribs 296, 298, a sloping surface 300 extending to ribs 296 providing a spreading effect, rib 298 sharpened to provide a cutter.

Figure 18:
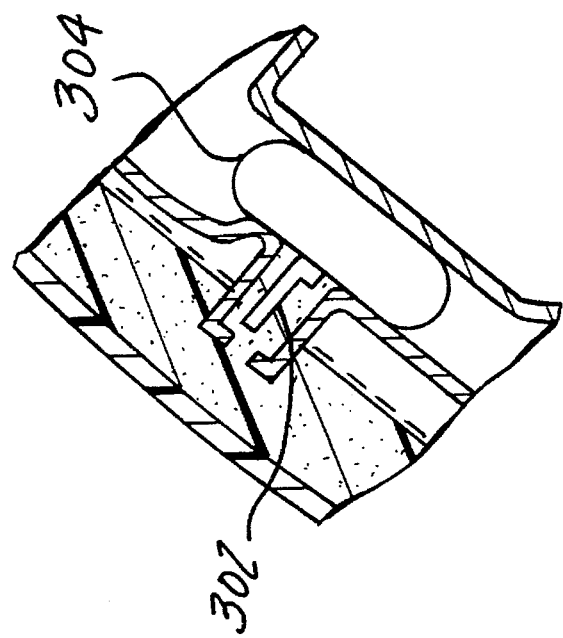
FIG. 18 is a fragmentary sectional view of an alternate form of the installation shown in FIG. 16.

In FIG. 18, separate cutter 302 is attached to flattened tube 304.

We claim:

1. An arrangement for forming an air bag deployment opening in a trim piece of a vehicle passenger compartment comprising:

a trim piece substrate having an opening formed therein;

a frame mounted to said trim piece substrate and extending around said opening therein;

at least one door substrate panel interfit in said opening and hinged along one side to an adjacent portion of said frame;

an air bag storage canister mounted behind said door substrate panel;

a covering layer smoothly overlying said trim piece substrate panel and said door substrate panel;

a linear element extending along the unhinged sides of said door substrate panel, a cutting edge directed outwardly towards said covering layer;

means movably mounting said cutting edge to be movable from a retracted position spaced from said covering layer to a penetrated extended position through said covering layer; and means separate from said air bag for generating pressure energy driving said cutting edge to said penetrated position upon initiation of air bag deployment, whereby said covering layer is severed over said door panel substrate to enable said door substrate panel to be hinged open by said air bag upon inflation thereof.

2. The arrangement according to claim 1 wherein said linear element includes linear enclosure and said means for generating pressure energy comprises a pyrotechnic charge in said enclosure and distributed along said linear element and ignited to generate pressure within said enclosure which is utilized to drive said cutting edge.

3. The arrangement according to claim 2 wherein said linear element comprises a flattened tube enclosing said pyrotechnic charge, said cutting edge attached to said tube to be driven outwardly by said flattened tube upon ignition of said pyrotechnic charge and expansion of said flattened tube.

4. The arrangement according to claim 3 wherein said cutting edge is formed on a separate piece attached to the exterior of said flattened tube.

5. The arrangement according to claim 3 wherein said cutting edge is comprised of a formed outer wall section in said flattened tube.

6. The arrangement according to claim 5 wherein said cutting edge defined by said formed section of said tube wall flattens out after penetration of said covering layer and full expansion of said flattened tube by ignition of said pyrotechnic charge.

7. The arrangement according to claim 5 wherein said flattened tube includes flattened areas on either of said cutting edge section, said section comprising an outwardly peaked central portion terminating in said cutting edge.

8. The arrangement according to claim 3 wherein said tube is a roll formed section having abutting flanges on a side away from said covering layer.

9. The arrangement according to claim 3 further including confining side structure on either side of said flattened tube.

10. The arrangement according to claim 9 wherein said side structure on either side of said flattened tube are inclined towards each other.

11. The arrangement according to 1 wherein a portion of said door frame mounts said linear element.

12. The arrangement according to claim 11 wherein a confining channel is formed about a portion of said frame, said linear element disposed therein.

13. The arrangement according to claim 12 wherein said linear element comprises a flattened tube containing a distributed pyrotechnic charge which is ignited to generate a fluid pressure expanding said tube and causing outward driving of said cutting edge.

14. The arrangement according to claim 11 wherein said door panel substrate abuts an inwardly disposed portion of said frame to absorb the reaction created by driving of said cutting edge outwardly.

15. The arrangement according to claim 1 wherein said frame is mounted to said trim piece substrate and extends completely around the perimeter of said opening therein, and wherein said linear element is mounted on a portion of said frame facing said covering layer.

16. The arrangement according to claim 15 wherein said linear element comprises a flattened tube containing a distributed pyrotechnic charge which is ignited to generate a fluid pressure expanding said tube causing outward driving of said cutting edge.

17. The arrangement according to claim 16 wherein said flattened tube includes open sides affixed to either side of said frame.

18. The arrangement according to claim 1 wherein said linear element is attached to a separate membrane assembled to said door substrate panel.

19. The arrangement according to claim 1 wherein said linear element comprises an elongated channel and a cutter piece fit therein and having a portion defining said cutting edge projecting towards an outer opening in said channel, said cutter including a base portion slidably fit in said channel; and, wherein said pyrotechnic charge is disposed in said channel beneath said base portion of said cutter piece.

20. The arrangement according to claim 19 wherein said cutter piece and channel are an integral extrusion, said base portion of said cutter piece bridged to a wall of said channel with a thin connecting portion.

21. The arrangement according to claim 19 wherein said cutting edge portion of said cutter piece is centrally located on said base portion and projects towards a slotted opening in said channel defined between outer walls thereof, and further including compressible seals interposed between a respective side of said base portions each side of said cutter piece and the inside of an opposing outer wall of said channel defining said slotted opening.

22. The arrangement according to claim 21 wherein said compressible seals are integral with said base portion of said dart cutter.

23. The arrangement according to claim 1 wherein said linear element comprises an inverted channel enclosing a pyrotechnic charge, and a cap mounted over said inverted channel and including sides disposed over the sides of said channel, said cap formed with a peak defining said cutting edge.

24. The arrangement according to claim 23 wherein said cap sides are attached and are of elastic material causing retraction of said cap after the decline of pressure generated by ignition of said pyrotechnic charge.

25. The arrangement according to claim 1 wherein said trim piece comprises an instrument panel and said door substrate panel is located on a passenger side of an automotive vehicle passenger compartment.

26. The arrangement according to claim 1 wherein said cutting edge is fixed along a portion of an outer perimeter of said door substrate panel, and said linear element is disposed on the opposite side of said door substrate panel extending along said portion of the perimeter thereof having said cutting edge fixed thereto, said door hinged out by said means pressure driving said cutting edge.

27. The arrangement according to claim 26 wherein said linear element comprises a flattened tube containing a pyrotechnic charge ignited when said air bag deployment is initiated to expand said flattened tube and drive said cutting edge on said door substrate panel into said covering layer.

28. A method of manufacturing an air bag canister and instrument panel assembly including an air bag deployment opening, comprising the steps of:

forming an instrument panel substrate with an opening;

fabricating a door substrate panel and a complementary frame configured to be fit into said instrument panel opening, said door substrate panel having an outwardly projecting cutting edge along each side thereof except for one side, and assembling said door substrate panel and frame into a subassembly in which said door substrate panel is hinged to said frame along said one side and free along the other sides so as to be able to be hinged open out of said frame;

assembling the frame and door substrate panel subassembly into said opening of said instrument panel by attaching said frame to a perimeter portion of said instrument panel extending around said opening;

forming a foam and skin overlayer over the outside of said instrument panel and door substrate panel frame assembly in a smooth covering;

forming an air bag storage canister with a perimeter channel opening towards an open side of said canister, said channel extending to be generally aligned with perimeter of said door substrate panel having said cutting edge formed thereon;

installing a pyrotechnic charge within a flattened tube extending along said channel; and thereafter assembling said air bag canister to said instrument panel by attaching the same to said frame previously installed therein as a part of said frame-door substrate panel subassembly.

29. A method of manufacturing an air bag canister and instrument panel assembly including an air bag deployment opening, comprising the steps of:

forming an instrument panel substrate with an opening;

fabricating a multisided door substrate panel configured to be fit into said instrument panel opening, said door substrate panel having an outwardly projecting cutting edge along each side thereof except for one side;

assembling the door substrate panel into said opening of said instrument panel;

forming a foam and skin overlayer over the outside of said instrument panel and door substrate panel frame assembly in a smooth covering to form a bonded composite;

fabricating an air bag storage canister with a mounting generally matching the perimeter of said door substrate panel;

installing a pyrotechnic charge within a flattened tube extending around said frame;

assembling said air bag canister to said frame and charge; and, mounting said air bag cannister and frame to said instrument panel door substrate and skin and foam composite by attaching said frame to perimeter portion of said instrument panel so that said door substrate panel is hinged to said frame along said one side and free along the other sides so as to be able to be hinged open out of said frame.

* * * * *

UNITED STATES PATENT AND TRADEMARK OFFICE
CERTIFICATE OF CORRECTION

PATENT NO. : 5,478,106
DATED : December 26, 1995
INVENTOR(S) : David J. Bauer

It is certified that error appears in the above-identified patent and that said Letters Patent is hereby corrected as shown below:

Column 1, line 9, "adopted" should be --adapted--.

Column 1, line 16, "driven" should be --driver--.

Column 4, line 36, "an" should be --a--.

Column 4, line 37, delete "is".

Column 4, line 48, "externally" should be --external--.

Column 4, line 55, "a" should be --an--.

Column 4, line 56, "in turned" should be --inturned--.

Column 5, line 26, "Farifield" should be --Fairfield--.

Column 5, line 51, "a" should be --an--.

Column 6, line 32, "seams" should be --seam--.

Column 7, line 38, "into through" should be --into--.

Column 8, line 2, "a" should be --an--.

UNITED STATES PATENT AND TRADEMARK OFFICE
CERTIFICATE OF CORRECTION

PATENT NO. : 5,478,106
DATED : December 26, 1995
INVENTOR(S) : David J. Bauer

It is certified that error appears in the above-identified patent and that said Letters Patent is hereby corrected as shown below:

Column 8, line 12, "to" (second occurrence) should be --the--.

Column 8, line 55, "186" should be --186 is--.

Column 9, line 51, "walls" should be --wall--.

Column 14, line 18, "cannister" should be --canister--.

Signed and Sealed this

Sixteenth Day of April, 1996

Attest:

BRUCE LEHMAN

Attesting Officer

Commissioner of Patents and Trademarks